(12) United States Patent
Kahre et al.

(10) Patent No.: US 6,832,667 B1
(45) Date of Patent: Dec. 21, 2004

(54) VEHICLE-MOUNTED MOBILE ADJUSTABLE RAMP SYSTEM

(75) Inventors: Steven Kahre, Spotsylvania, VA (US); Charles Fuqua, Woodbridge, VA (US); Trevor Tuggle, Fredericksburg, VA (US)

(73) Assignee: Patriot3, Woodbridge, VA (US)

( * ) Notice: Subject to any disclaimer, the term of this patent is extended or adjusted under 35 U.S.C. 154(b) by 112 days.

(21) Appl. No.: 10/157,394

(22) Filed: May 30, 2002

(51) Int. Cl.[7] ............................................... E06C 5/00
(52) U.S. Cl. .................... 182/127; 182/63.1; 182/86; 182/97; 296/3
(58) Field of Search ................... 182/86, 95, 97, 182/63.1, 68, 116, 127, 187; 296/3

(56) References Cited

U.S. PATENT DOCUMENTS

| | | | | |
|---|---|---|---|---|
| 2,116,470 A | * | 5/1938 | Kiley et al. | 182/127 |
| 3,605,943 A | * | 9/1971 | Beaudet et al. | 182/127 |
| 3,664,456 A | * | 5/1972 | Smith, Sr. et al. | 182/62.5 |
| 4,081,091 A | * | 3/1978 | Thorley | 214/75 R |
| 4,251,179 A | * | 2/1981 | Thorley | 414/545 |
| 4,456,420 A | * | 6/1984 | Newhard | 414/478 |
| 4,479,753 A | * | 10/1984 | Thorley | 414/541 |
| 4,613,155 A | * | 9/1986 | Greenwood | 280/760 |
| 4,718,812 A | * | 1/1988 | Smalley et al. | 414/540 |
| 4,877,108 A | * | 10/1989 | Griffin et al. | 182/68 |
| 5,110,252 A | * | 5/1992 | Aoki | 414/549 |
| 5,286,049 A | * | 2/1994 | Khan | 280/163 |
| 5,538,100 A | * | 7/1996 | Hedley | 182/97 |
| 5,702,222 A | * | 12/1997 | Rosen | 414/228 |
| 5,749,436 A | * | 5/1998 | Satchwell, III | 182/127 |
| 5,769,439 A | * | 6/1998 | Thompson | 280/163 |
| 6,105,721 A | * | 8/2000 | Haynes | 182/127 |
| 6,347,686 B1 | * | 2/2002 | Hedley et al. | 182/86 |
| 6,382,650 B1 | * | 5/2002 | Farkash | 280/164.1 |
| 6,484,344 B1 | * | 11/2002 | Cooper | 14/71.1 |
| 6,491,331 B1 | * | 12/2002 | Fox | 296/26.09 |
| 2003/0000769 A1 | * | 1/2003 | Pyle | 182/63.1 |

OTHER PUBLICATIONS

Timothy G. Clemente: U.S. Appl. No. 09/599,010 entitled "Height Adjustable Rescue Assault System," filed Jun. 22, 2000, specification–8 pages, Figures 1–30 (15 pages).

Height Adjustable Rescue Assault System materials; www.s-watec.com, 2001.

Declaration of Steven Kahre Under 37 C.F.R. § 1.56 & Exhibits A&B, May 2001.

* cited by examiner

*Primary Examiner*—Bruce A. Lev
(74) *Attorney, Agent, or Firm*—Harrity & Snyder, LLP

(57) ABSTRACT

A vehicle-mounted system includes a platform that is attachable to a front and a rear of a vehicle. A main surface of the platform is located above the vehicle. One or more ramps are rotatably connected to the platform. Each of the ramps includes an extending portion located under a top surface of the ramp. A first hydraulic system is configured to incline the ramps relative to the main surface of the platform. A second hydraulic system is configured to extend the extending portions of the ramps.

27 Claims, 11 Drawing Sheets

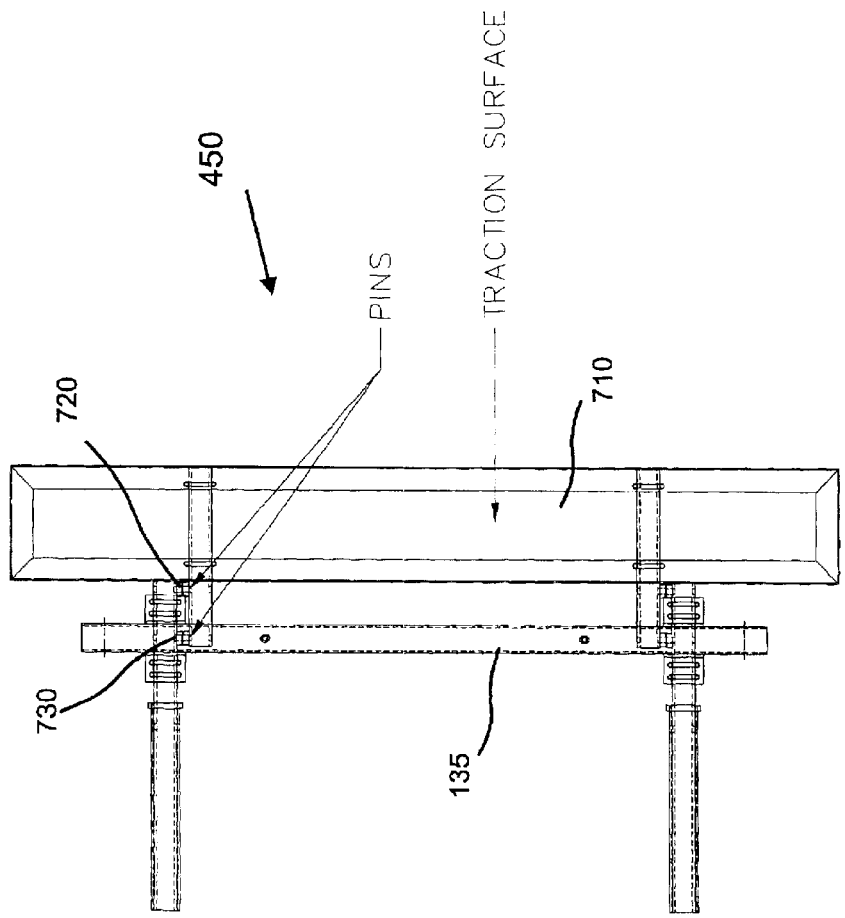
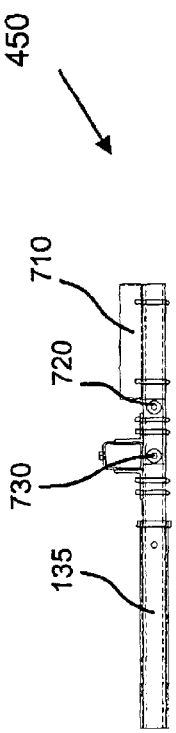
Fig. 7A
Fig. 7B

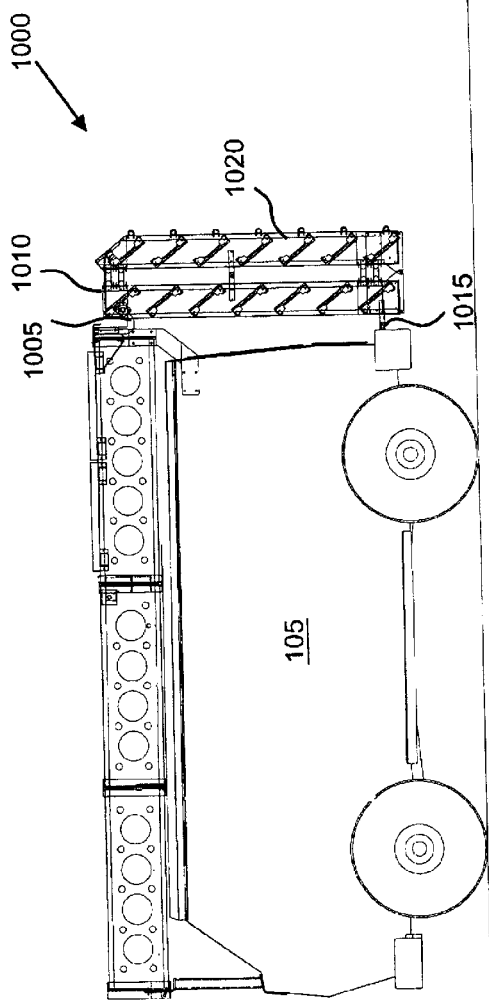
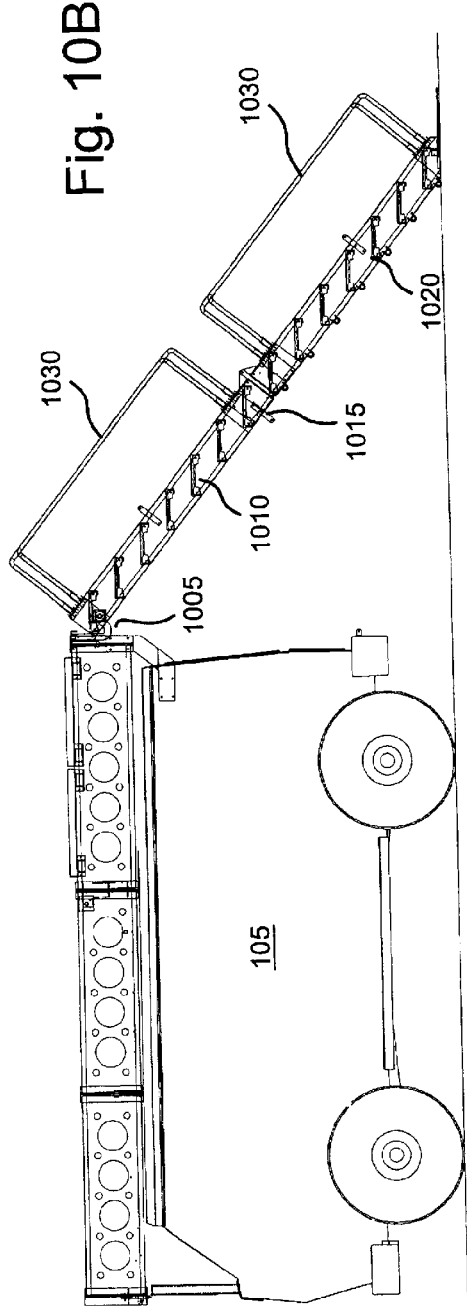

US 6,832,667 B1

VEHICLE-MOUNTED MOBILE ADJUSTABLE RAMP SYSTEM

BACKGROUND OF THE INVENTION

1. Field of the Invention

The present invention relates generally to vehicle-mounted systems, and more specifically, to vehicle-mounted systems that have a portion that is adjustable in height.

2. Description of Related Art

Vehicle-mounted systems may be advantageously attached and removed from different vehicles as needs arise, allowing the use of a single vehicle for multiple tasks. Certain vehicle-mounted systems may be configured to provide variable-height access to a structure or another vehicle (e.g., an airplane). Such systems may include, for example, a ramp, one end of which may be raised to provide access to structures at different heights.

One use of such vehicle-mounted systems is in so-called "breach" scenarios, where terrorists have taken hostages or are otherwise occupying a structure or an airplane. A vehicle and such a vehicle-mounted system with a number of users aboard may be rather quickly driven adjacent to the structure in question, and the users may access doors, windows, or other openings at some height off the ground using the ramps.

Operational shortcomings of such vehicle-mounted systems may include, for example, a low speed at which a desired height or position may be attained. Delay, at least in anti-terrorism "breaching" scenarios, may result in unnecessary injury to innocent people and/or damage to property. Accordingly, there is a need for vehicle-mounted systems that can rapidly adjust to a number of heights and positions.

SUMMARY OF THE INVENTION

Methods and systems consistent with the present invention address this and other needs by providing a vehicle-mounted platform that has ramps that may be inclined at one rate and extendable portions of the ramps that may be extended at a faster rate.

In accordance with one purpose of the invention as embodied and broadly described herein, a vehicle-mounted system may include a platform that is attachable to a front and a rear of a vehicle. A main surface of the platform may be located above the vehicle. A number of ramps may be rotatably connected to the platform. Each of the ramps may include an extending portion located under a top surface of the ramp. A first hydraulic system may be configured to incline the ramps relative to the main surface of the platform. A second hydraulic system may be configured to extend the extending portions of the ramps.

In another implementation consistent with the principles of the invention, a vehicle-mountable system may include a support structure that is attachable to a front and a rear of a vehicle and configured to extend above the vehicle. A ramp may be rotatably connected to the support structure. The ramp may include an extending portion. A first hydraulic actuator may be configured to incline a forward end of the ramp. A ramp pump may be configured to move the first hydraulic actuator at a first speed. A second hydraulic actuator may be configured to extend the extending portion from the forward end of the ramp. An extension pump may be configured to move the second hydraulic actuator at a second speed that is greater than the first speed.

In a further implementation consistent with the principles of the invention, a vehicle-mountable system may include a support structure attachable to a front and a rear of a vehicle and configured to extend above the vehicle. A ramp may be rotatably connected to the support structure. The ramp may include an extending portion located within the ramp when retracted. A rear step may be connectable to the rear of the vehicle. The rear step may be configured to either rigidly attach to the vehicle or attach to the vehicle so that the rear step may pivot upwards. A running board may be attachable to an underside of the vehicle. The running board may be attachable in different positions so that the running board either protrudes from a side of the vehicle or rests substantially under the vehicle. A ladder may be rotatably connected to a rear of the support structure. The ladder may be configured to rotate upward to provide access to the rear of the vehicle.

In yet another implementation consistent with the principles of the invention, a vehicle-mountable system may include a platform attachable to a front and a rear of a vehicle and configured to extend above the vehicle. A ramp may be rotatably connected to the platform. The ramp may include an extending portion located under a main surface of the ramp when retracted. A rear step may be connectable to the rear of the vehicle. The rear step may be attachable to the vehicle so that the rear step may pivot upwards. A folding stairway may be configured to provide access to a rear of the platform. The stairway may also be configured to vertically fold against the rear of the vehicle when not in use.

BRIEF DESCRIPTION OF THE DRAWINGS

FIGS. 7A and 7B show top and side views of the rear tactical step in FIG. 4;

FIGS. 10A and 10B illustrate a folding rear stairway in an implementation consistent with the principles of the invention;

DETAILED DESCRIPTION

Figure 1:
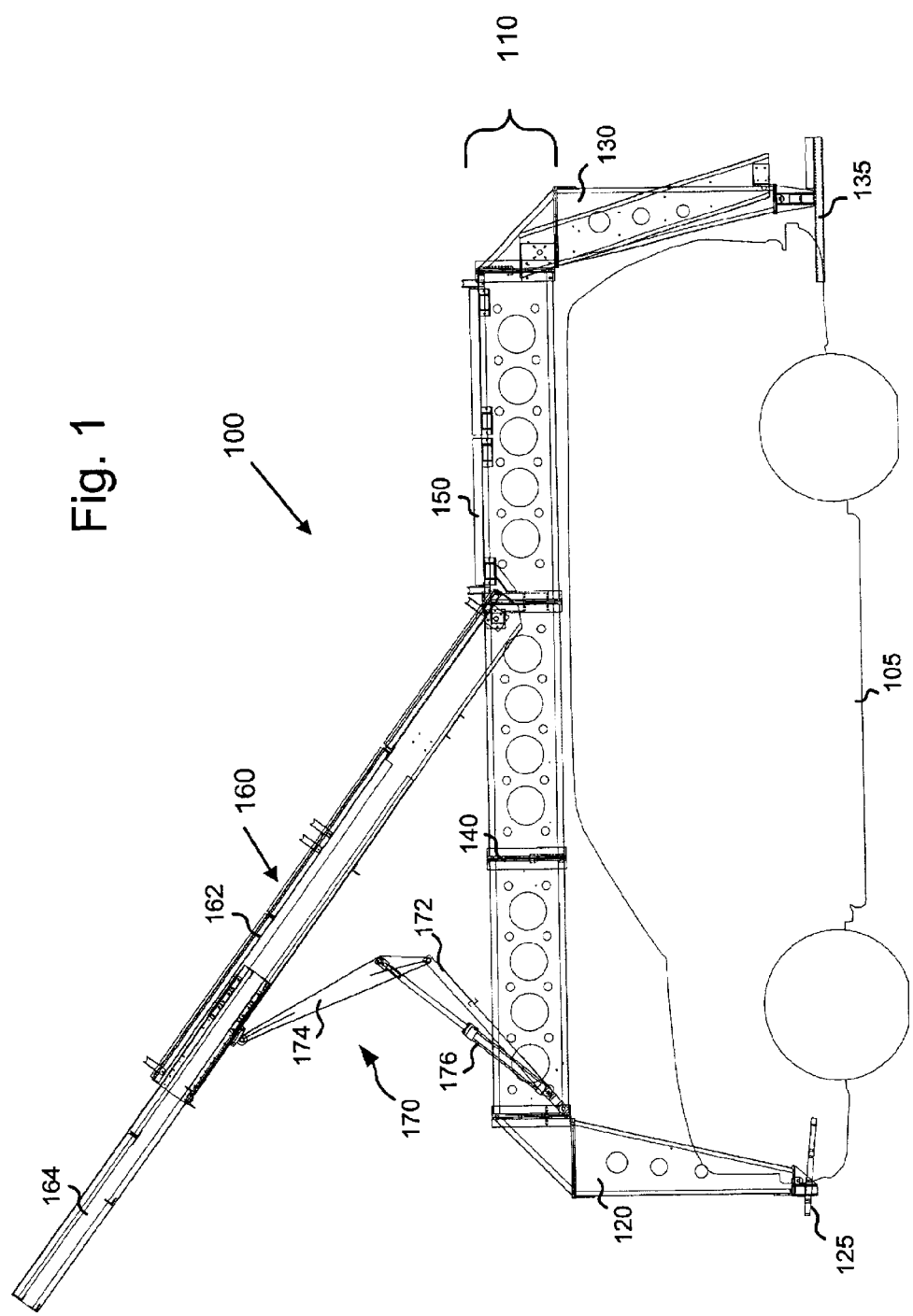
FIG. 1 is a side view of a mobile adjustable ramp system mounted on a vehicle according to an implementation consistent with the present invention.

FIG. 1 is a side view of a mobile adjustable ramp system 100 mounted on a vehicle 105 according to an implementation consistent with the present invention. System 100 may include a platform 110, a front support member 120, and a rear support member 130. The system 100 may be connected to the vehicle 105 by connecting the front support member 120 to a front vehicle support 125 and by connecting the rear support member 130 to a rear vehicle support 135. Both the front and rear vehicle supports 125 and 135 may be rigidly mounted to the vehicle 105.

The platform 110 may include a support structure 140, a deck 150, one or more ramps 160, and one or more ramp actuators 170. The ramps 160 may be rotatably connected to the support structure 140 at one end. The ramp actuators 170 may be connected between the support structure 140 and the ramps 160, and may be configured to raise the ramps 160.

The support structure 140 may include, in one implementation, two rails extending along the sides of the vehicle 105. The rails may be connected by one or more cross members extending across a width of the vehicle 105 to form a rigid support structure 140. The support structure 140 may be formed of, for example, aluminum or any other suitable material that is both light and rigid.

The deck 150 may be connected to the top of the support structure at the rear of the ramps 160. The deck 150 may provide a place for users of the system 100 to stand. Accordingly, the upper surface of the deck 150 may be textured to facilitate traction.

Ramps 160 may each include a main portion 162 and an extending portion 164. The main portion 162 may be connected to one end of the ramp actuators 170, and may be inclined by the ramp actuators 170. The extending portion 164 may be configured to fit within the main portion 162. The extending portion 164 may be extended out of, and retracted into, the main portion 162 by one or more extending actuators (not shown). In this manner, the ramps 160 may both incline and change in length. Similar to the deck 150, the upper surface of both the main portion 162 and the extending portion 164 of the ramps 160 may be textured to promote traction.

In one implementation consistent with the principles of the invention, ramp actuators 170 may each include a lower member 172, an upper member 174, and a hydraulic member 176. The lower member 172 may be rotationally connected to the support structure 140 and rotationally connected to the upper member 174. The upper member 174 may be rotationally connected to the main portion 162 of a ramp 160. The hydraulic member 176 may be rotationally connected to, for example, the upper member 174. As will be appreciated by those skilled in the art, when actuated by a pump (not shown), the hydraulic member 176 in combination with the upper and lower members 172 and 174 may operate to raise one or more of the ramps 160.

Figure 2:
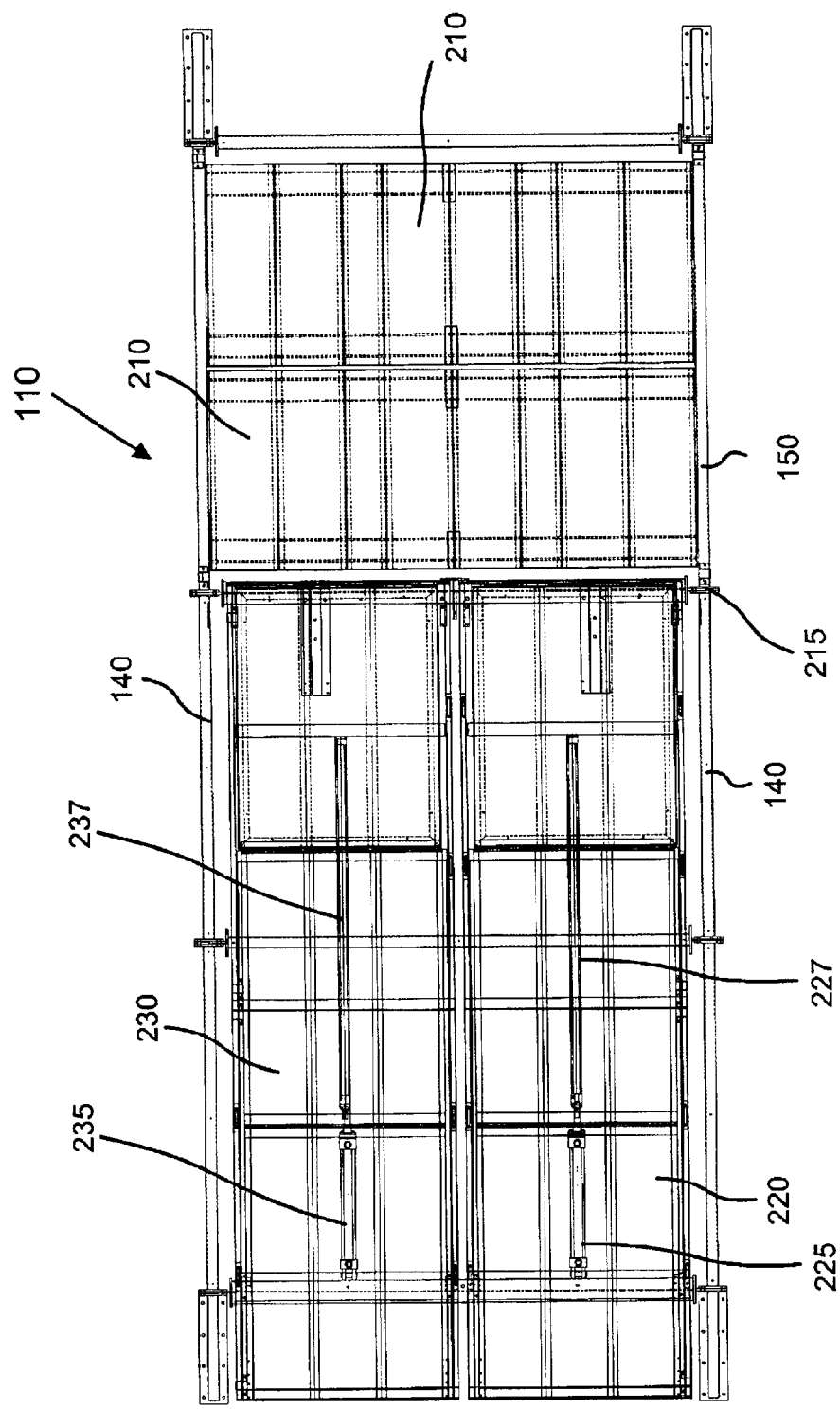
FIG. 2 shows a top view of the platform of FIG. 1 according to an implementation consistent with the present invention.

FIG. 2 shows a top view of the platform 110 according to an implementation consistent with the present invention. The platform 110 may include, for example, one or more plates 210 that define the upper surface of the deck 150. The ramps 160 may include two ramps: a left ramp 220 and a right ramp 230. As used herein, "left" and "right" generally refer to a perspective of a person in or behind the vehicle 105 (i.e., "left" refers to the driver's side and "right" refers to the passenger's side of the vehicle 105).

The left and right ramps 220 and 230 may be rotationally connected to the support structure 140 by a hinge member 215. The left ramp 220 may be configured to be independently raised and lowered by a left hydraulic actuator 225 (which is visible in FIG. 2 for explanation purposes, though it is located below the left ramp 220). The left hydraulic actuator 225 is one specific implementation of the hydraulic member 176; other implementations are possible. Similarly, the right ramp 230 may be configured to be independently raised and lowered by right hydraulic actuator 235 (which is also visible in FIG. 2 for explanation purposes, though it is located below the right ramp 230). The right hydraulic actuator 235 is another specific implementation of the hydraulic member 176; other implementations are possible.

Also illustrated in FIG. 2, although also located below ramps 220 and 230 respectively, are a left extending actuator 227 and a right extending actuator 237. The left extending actuator 227 may be a hydraulic actuator, and may function to linearly extend and retract the extending ramp portion 164 within the left ramp 220. The right extending actuator 237 also may be a hydraulic actuator, and may function to linearly extend and retract the extending ramp portion 164 within the right ramp 230.

Figure 3:
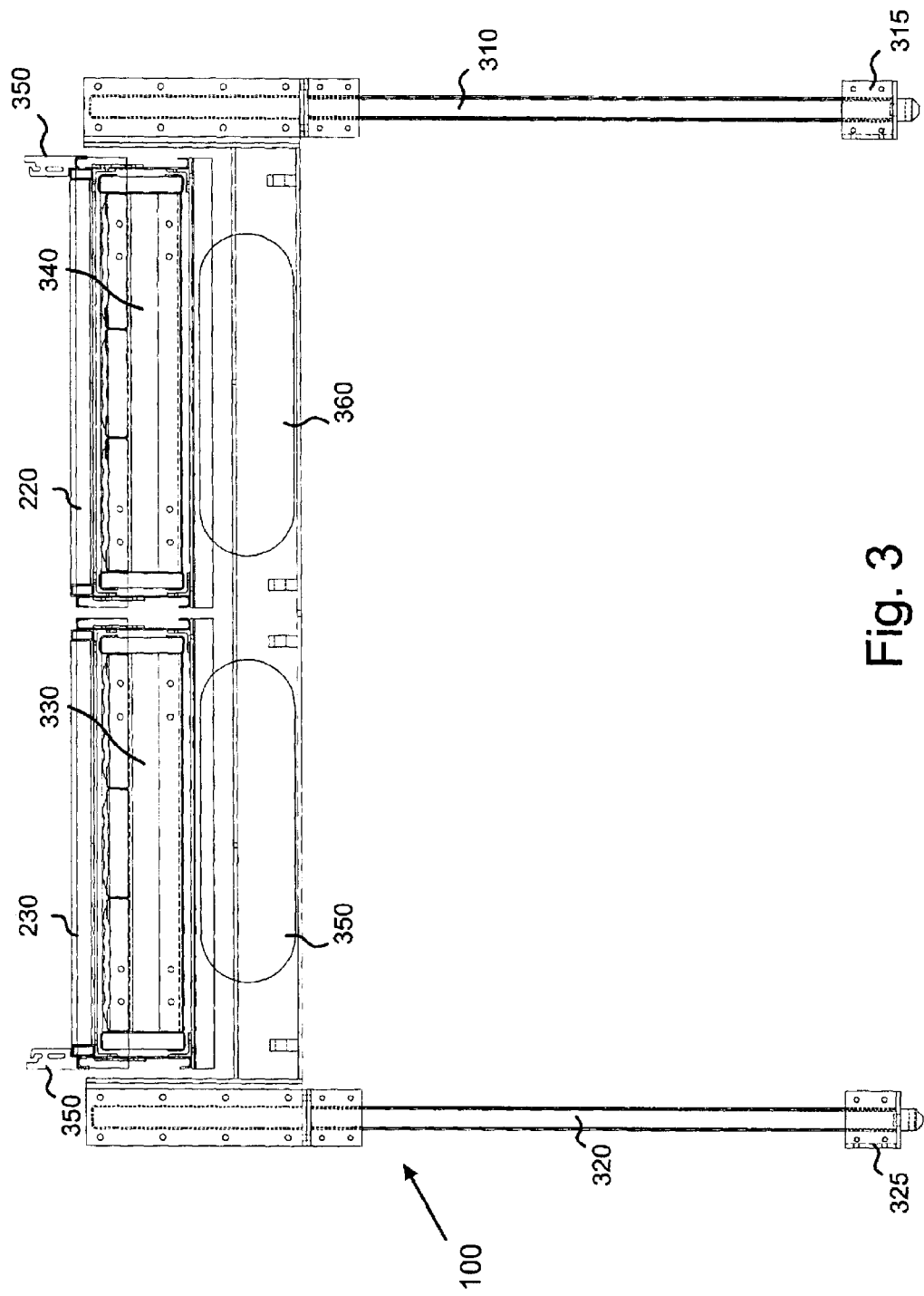
FIG. 3 illustrates a front view of the ramp system of FIG. 1 according to an implementation consistent with the principles of the invention.

FIG. 3 illustrates a front view of the system 100 according to an implementation consistent with the principles of the invention. Front support member 120 may include a left support 310, a left bracket 315, a right support 320, and a right bracket 325. The left support 310 and the right support 320 may be long enough so that the bottom of the platform 110 clears the top of the vehicle 105. The left and right brackets 315 and 325 may be configured to connect to the front vehicle support 125. The left and right brackets 315 and 325 may also be configured to accept an external jack or wheeled support assembly (not shown) attached to their outer portions. In this manner, the system 100 may be supported while the vehicle 105 drives under/out from under the system 100 for ease in attachment and removal of the system 100 from the vehicle 105.

The extending portions 164 of the ramps 160 may include a left extending portion 340 and a right extending portion 330. Each of the left extending portion and right extending portion 340 and 330 may include an actuator (i.e., the left extending actuator 227 and the right extending actuator 237 shown in FIG. 2) configured to independently extend and retract the extending portion. Each extending portion 330 and 340 may also include a video camera or similar device (not shown) in its forward end, so that an operator may more accurately extend and retract these portions. The cameras may also be used for surveillance and other monitoring purposes and may be attached (or wirelessly connected) to one or more monitors within the vehicle 105.

The main portions 162 of ramps 160 may include handrail supports 350 attached to the outer sides. These handrail supports 350 may be configured to lock vertical handrails (not shown) in place. The vertical handrails may be folded flat along the upper surface of the main ramp portion 162 before and/or after vertical deployment.

The system 100 may also include a hydraulic ramp pump 350 and a hydraulic extender pump 360. These pumps 350 and 360 may be located, for example, below the deck 150. The ramp pump 350 may be configured to provide hydraulic fluid to both the left actuator 225 and the right actuator 235 to raise and lower left ramp 220 and right ramp 230. Because the ramp pump 350 must raise and lower relatively heavy ramps, it may be a high pressure pump that moves a relatively low volume of hydraulic fluid, and hence may only be capable of moving the left and right actuators 225 and 235 at a relatively low speed.

Extender pump 360 may be configured to provide hydraulic fluid to hydraulic actuators (e.g., 227, 237) within the left ramp 220 and the right ramp 230. Because the left extending portion 340 and the right extending portion 330 do not require as much force as the ramps to move, the extender pump 360 may be a low pressure pump that moves a relatively high volume of hydraulic fluid, and hence may move the left extending portion 340 and the right extending portion 330 at a relatively high speed. Because of the separate ramp pump 350 and extender pump 360, the extending portion 164 of the ramps 160 may be extended and retracted at a much higher rate than the ramps 160 are raised and lowered. This rapid extending capability of system 100 will have operational advantages that will be apparent to those skilled in the art.

Figure 4:
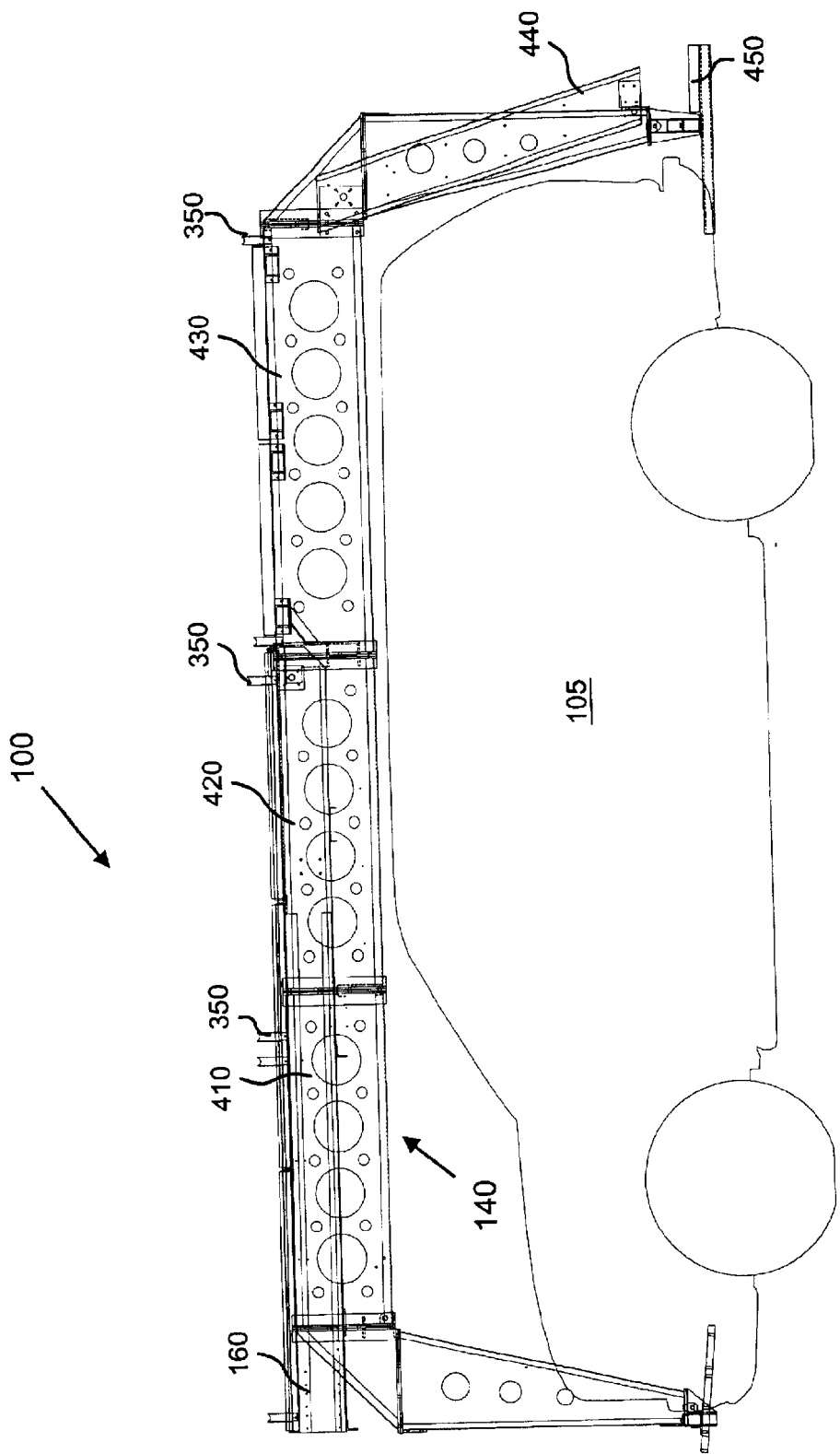
FIG. 4 shows a side view of the ramp system of FIG. 1 with the ramps fully retracted.

FIG. 4 shows a side view of the system 100 with the ramps 160 fully retracted. Support structure 140 may include side rails including a forward member 410, a middle member 420, and a rear member 430. These modular forward, middle, and rear members 410–430 may be rigidly attached by suitable connectors (e.g., bolts). The lengths of one or more of the front member 410 and the rear member 430 may be adjusted to accommodate various lengths of vehicles 105.

The rear support member 130 may include a ladder 440 and a rear step 450. The ladder 440 may extend along an entire width of the system 100, or it may only be a portion of the width of the system 100 (e.g., leaving access to a rear door of the vehicle unimpeded). The ladder 440 may provide access to the platform 100 from the ground. The ladder 440 may also pivot upwards about its upper connection to the rear support member 130 to provide unimpeded access to the rear of the vehicle 105 (e.g., rear door(s) of the vehicle).

The rear step 450 may be configured to support one or more users of the system 100 when, for example, the vehicle 105 is in motion.

FIGS. 7A and 7B show top and side views of the rear tactical step 450. Rear step 450 may be attached to the rear vehicle support 135 to provide a rigid platform for supporting users. Rear step may include a traction surface 710 that may be textured to provide traction against the soles of users' shoes. In one implementation consistent with the principles of the invention, the rear step 450 may be attached to the rear vehicle support 135 by at least one set of rear pins 720 and forward pins 730. The presence of both sets of pins 720/730 rigidly attaches the rear step 450 to the vehicle 105. Removal of both sets of pins 720/730 allows the rear step 450 to be separated from the system 100, for example, for storage or shipping.

Forward pins 730 may be configured to both hold the rear step 450 level, while allowing the rear step 450 to pivot upwards when the rear pins 720 are removed. In other words, absent the rear pins 720, the rear step 450 may pivot upwards about the forward pins 730. This arrangement advantageously permits, for example, the vehicle 105 to back up a more inclined ramp than if the rear step 450 jutted rigidly outward.

Figure 5:
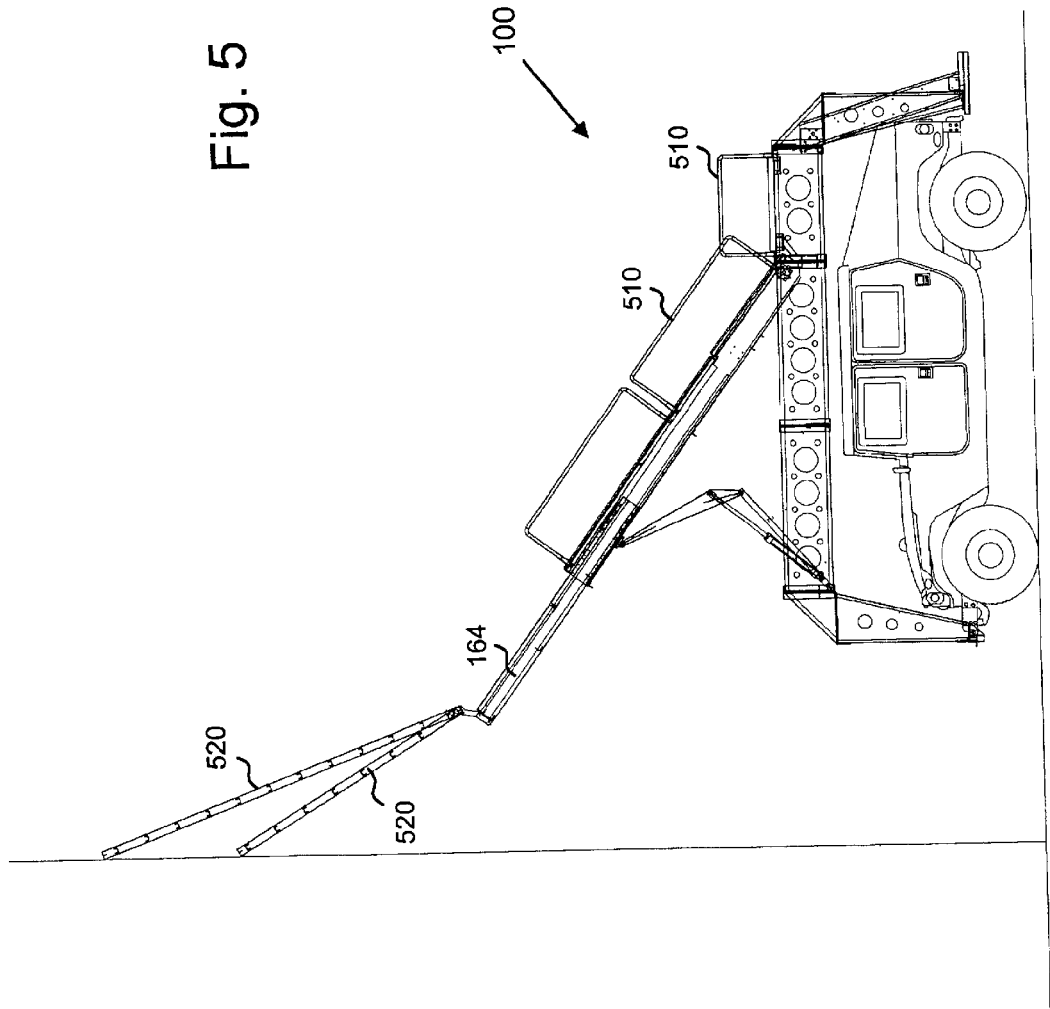
FIG. 5 shows the ramp system of FIG. 1 in a fully extended configuration.

FIG. 5 shows the ramp system 100 in a fully extended configuration. As shown in FIG. 5, the system 100 may include handrails 510 that have been vertically extended, and locked into such a position using handrail supports 350 as described above.

Although not explicitly illustrated, a top tube of the forward-most handrail 510 on the main portion 162 of the ramp 160 may contain a telescoping member (not shown). The telescoping member when extended may stretch forward along an outer edge of the extending portion 164. The extending portion 164 may include a rotatable vertical support (not shown) at its end. The rotatable vertical support and the telescoping member may be configured to connect when both are extended to define a handrail along the extending portion 164 of the ramp 160. This "extending" or "telescoping" handrail may be connected to the forward-most handrail 510 shown in FIG. 5, and may provide added safety to users on the extending portion 164 of the ramp 160.

With the ramp 160 fully inclined, and the extending portion 164 fully extended, the end of the extending portion 164 may be, for example, ten feet or greater above a top surface (e.g., the deck 150) of the platform 110. The ramps 160 may also include one or more scaling ladders 520 pivotally attached to the end of the extending portion 164 to provide additional vertical height. In another implementation, one or more of the ladders 520 may be replaced by a perimeter breach ramp (not shown). The perimeter breach ramp may be pivotally attached to the end of the extending portion 164 to provide a downward-sloping surface to provide ground access beyond a vertical obstacle, such as a fence or a wall.

In still another implementation consistent with the principles of the invention, one or more of the ladders 520 may be replaced by an observation platform (not shown). This observation platform may include a seat portion and a higher table portion on which an observer or a sniper may perch. The system 100, in combination with the observation platform, may quickly raise an observer or sniper to an advantageous tactical vantage point, where no similar vantage points are readily attainable.

Figure 6:
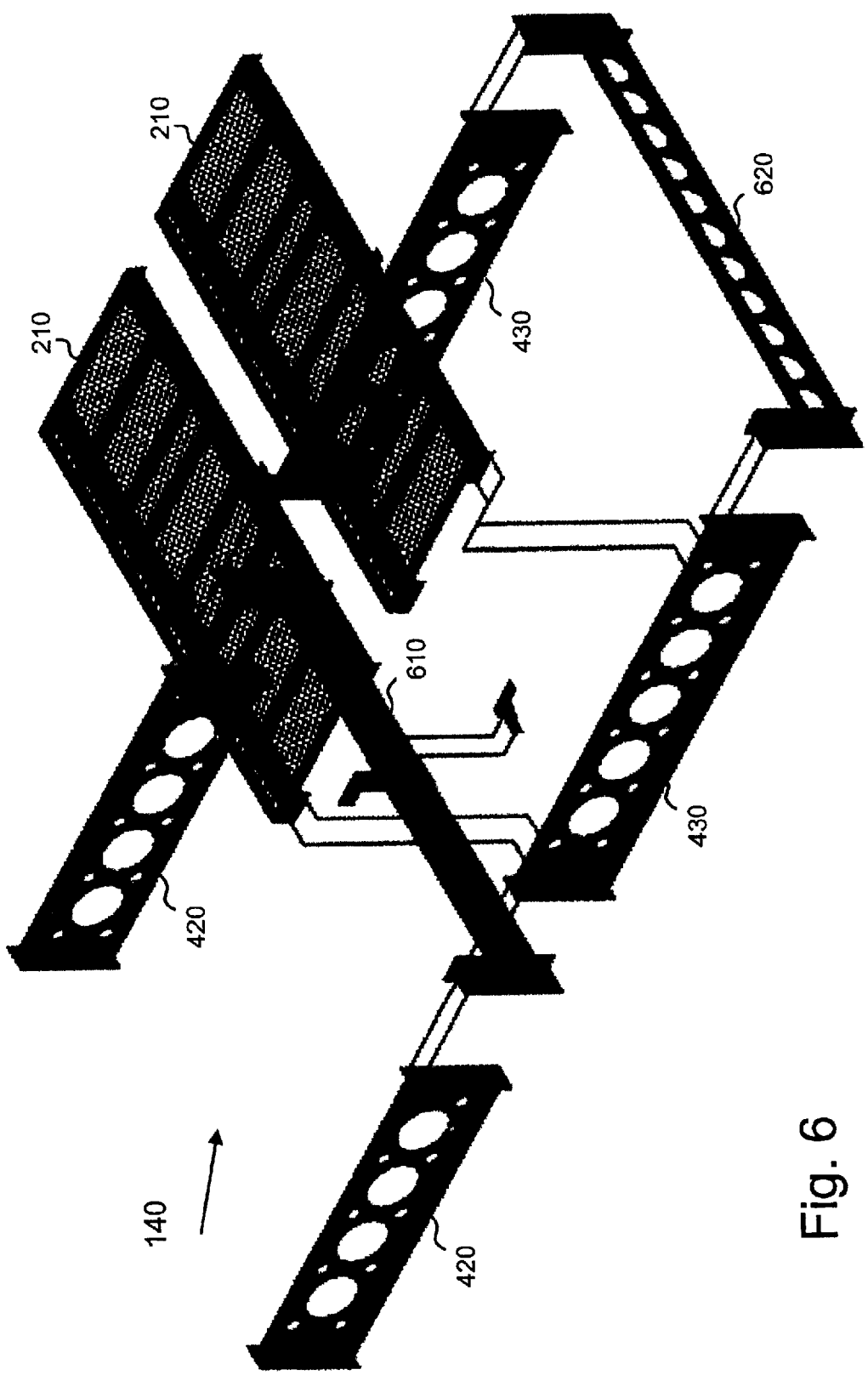
FIG. 6 provides a detailed perspective view of the support structure for the ramp system of FIG. 1 according to an implementation consistent with the principles of the invention.

FIG. 6 provides a detailed perspective view of the support structure 140 according to an implementation consistent with the principles of the invention. As previously described, the support structure 140 may include middle members 420 and rear members 430, which comprise the two side rails of the support structure 140. In addition, the support structure 140 may include a middle lateral member 610 and a rear lateral member 620.

The middle lateral member 610 may be connected between the support members 420 and 430. The middle lateral support member 610 may also provide support for, for example, the hinge(s) 215 upon which ramps 160 are attached and rotate.

The rear lateral support member 620 may provide stability to the support structure 140, as well as a connection point for the rear support member 130, the rear ladder 440, etc. As previously described, plates 210, which comprise the deck 150, may attach to rear members 430.

Figure 8:
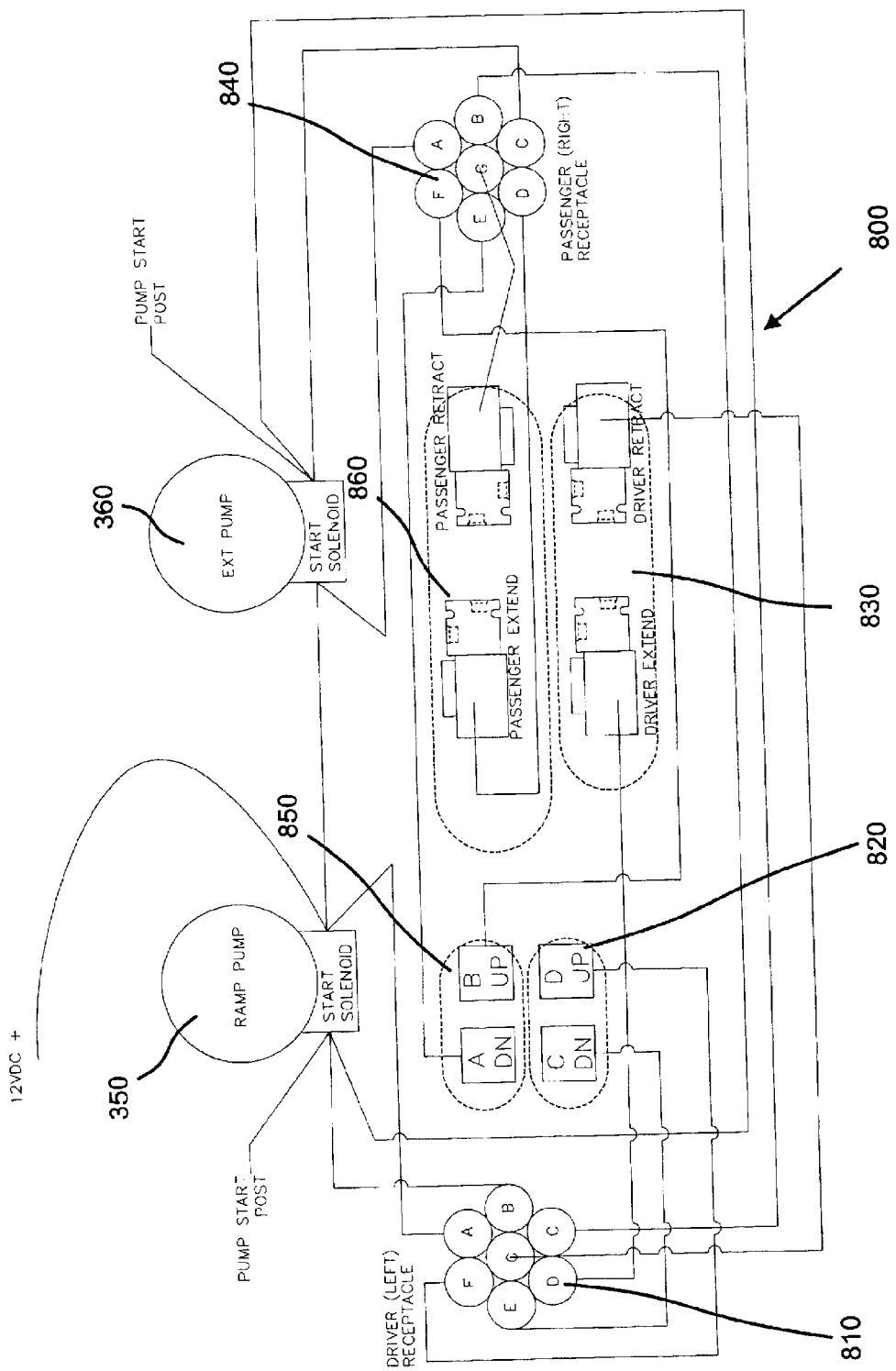
FIG. 8 is a diagram illustrating a control system for the ramp pump and the extender pump in FIG. 3.

FIG. 8 is a diagram illustrating a control system 800 for the ramp pump 350 and the extender pump 360. Both of these pumps 350 and 360 may be powered by, for example, a 12 V direct current (DC) power supply from the vehicle 105, and may each have an associated solenoid to aid in starting. The control system 800 may include a left electrical interface 810, left ramp controllers 820, left extender controllers 830, a right electrical interface 840, right ramp controllers 850, and right extender controllers 860. Because of their similarity to the right electrical interface 840, right ramp controllers 850, and right extender controllers 860, only the left electrical interface 810, left ramp controllers 820, and left extender controllers 830 will be described in detail.

The left electrical interface 810 may include, for example, a seven-pin connector that may include electrical connections to power, the ramp pump 350, the extender pump 360, the left ramp controllers 820, and the left extender controllers 830. Depending on electrical connections among the pins in the interface 810, one or more of the pumps 350/360 may be turned on, and hydraulic fluid from the pumps 350/360 may be respectively directed to the left hydraulic actuator 225 and the left extending actuator 227 to move the left ramp 220 and the left extending portion 340. The left electrical interface 810 may be connected to a removable controller.

Figure 9:
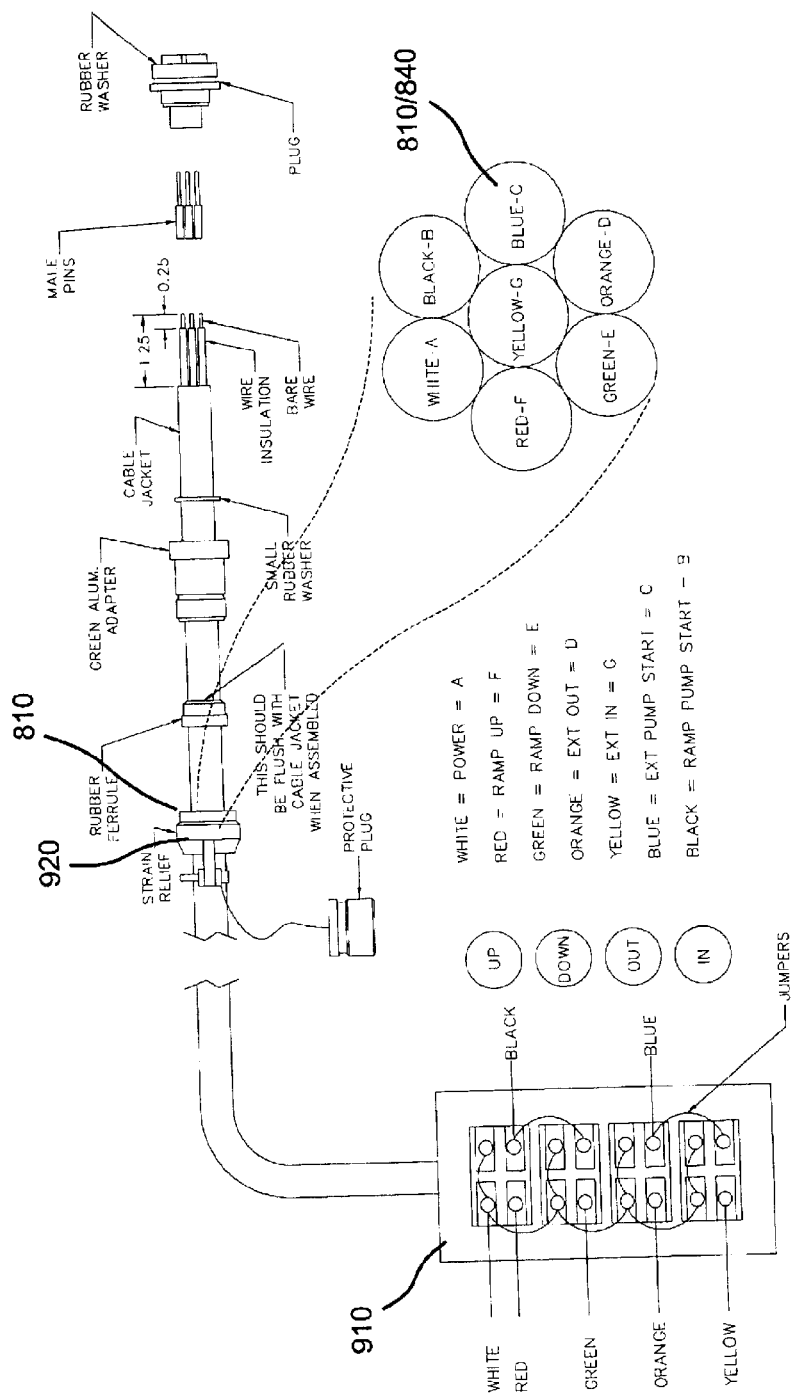
FIG. 9 illustrates a removable controller according to an implementation consistent with the principles of the invention that may be used with the control system of FIG. 8.

FIG. 9 illustrates a removable controller 910 according to an implementation consistent with the principles of the invention that may be used with the control system 800. Controller 910 may be internally configured to provide various connections among the electrical points in the interface 810. The controller 910 may include a number of buttons, for example, UP, DOWN, OUT, and IN, which when pressed serve to control the motion of the ramp 220 and the extending portion 340.

The controller 910 may be connected to the interface 810 by a removable connector 920. Connectors, such as connector 920, are known and used in various pieces of (e.g., military) equipment, and may be ruggedized and include, for example, a protective cap or plug. The removable connector 920 allows the controller 910 to be removed from the system 100 and separately stored when the control system 800 is not in use. The ability to remove controller 910 may provide extra protection against weather and unauthorized use of the system 100.

In one implementation consistent with the principles of the invention, a redundant controller to controller 910 may be located inside the vehicle 105, so that the system 100 may be operated by an operator of the vehicle. In yet another implementation consistent with the principles of the invention, the controller 910 may be wirelessly (e.g., by a radio frequency (RF) interface) connected to, for example, the ramp controllers 820 and the extender controllers 830. Such a wireless connection may also facilitate separate storage of the controller 910, as well as operation of the ramps 160 from any location around or within the vehicle 105.

Returning to FIG. 8, the left ramp controllers 820 may be actuated by electrically connecting certain points of the interface 810. The ramp controllers 820 may be, for example, valves or other hydraulic control apparatuses known to those skilled in the art that are suitable for controlling hydraulic fluid to/from hydraulic pumps. One of the ramp controllers 820 may operate to control fluid from the ramp pump 350 to raise the ramp 220, and the other one of the ramp controllers 820 may operate to control fluid from the ramp pump 350 to lower the ramp 220.

The left extender controllers 830 may be actuated by electrically connecting certain pins of the interface 810. The extender controllers 830 may be, for example, valves or other hydraulic control apparatuses known to those skilled in the art that are suitable for controlling hydraulic fluid to/from hydraulic pumps. One of the extender controllers 830 may operate to control fluid from the extender pump 360 to extend the left extending portion 340, and the other one of the extender controllers 830 may operate to control fluid from the extender pump 360 to retract the left extending portion 340.

FIGS. 10A and 10B illustrate a folding rear stairway 1000 in an implementation consistent with the principles of the invention. The rear stairway 1000 may attach to the platform 110 by a hinge 1005 or a similar rotational connector. The rear stairway 1000 may attach (e.g., by a pin or other easily removable mechanism) to the vehicle 105 by a connecting member 1015 that holds the stairway against and slightly apart from the vehicle 105.

The rear stairway 1000 may include an upper part 1010 and a lower part 1020. The upper part 1010 and the lower part 1020 may be rotationally attached by a (possibly locking) hinge to allow the two parts 1010/1020 to unfold into a sloped configuration as shown in FIG. 10B. Both parts 1010/1020 of the rear stairway may include a number of steps that are suitably wide and spaced to facilitate traversal up and down the stairway 1000. Both parts 1010/1020 of the rear stairway also may include folding handrails 1030 that are configured to fold flat for storage and lock upright similarly to the previously described handrails 510.

In one implementation consistent with the principles of the invention, the rear stairway 1000 may be attached to the platform instead of the ladder 440. In another implementation consistent with the principles of the invention, the rear stairway 1000 may be attached to the platform in addition to the ladder 440. This latter implementation may involve, for example, a longer connecting member 1015.

Figure 11:
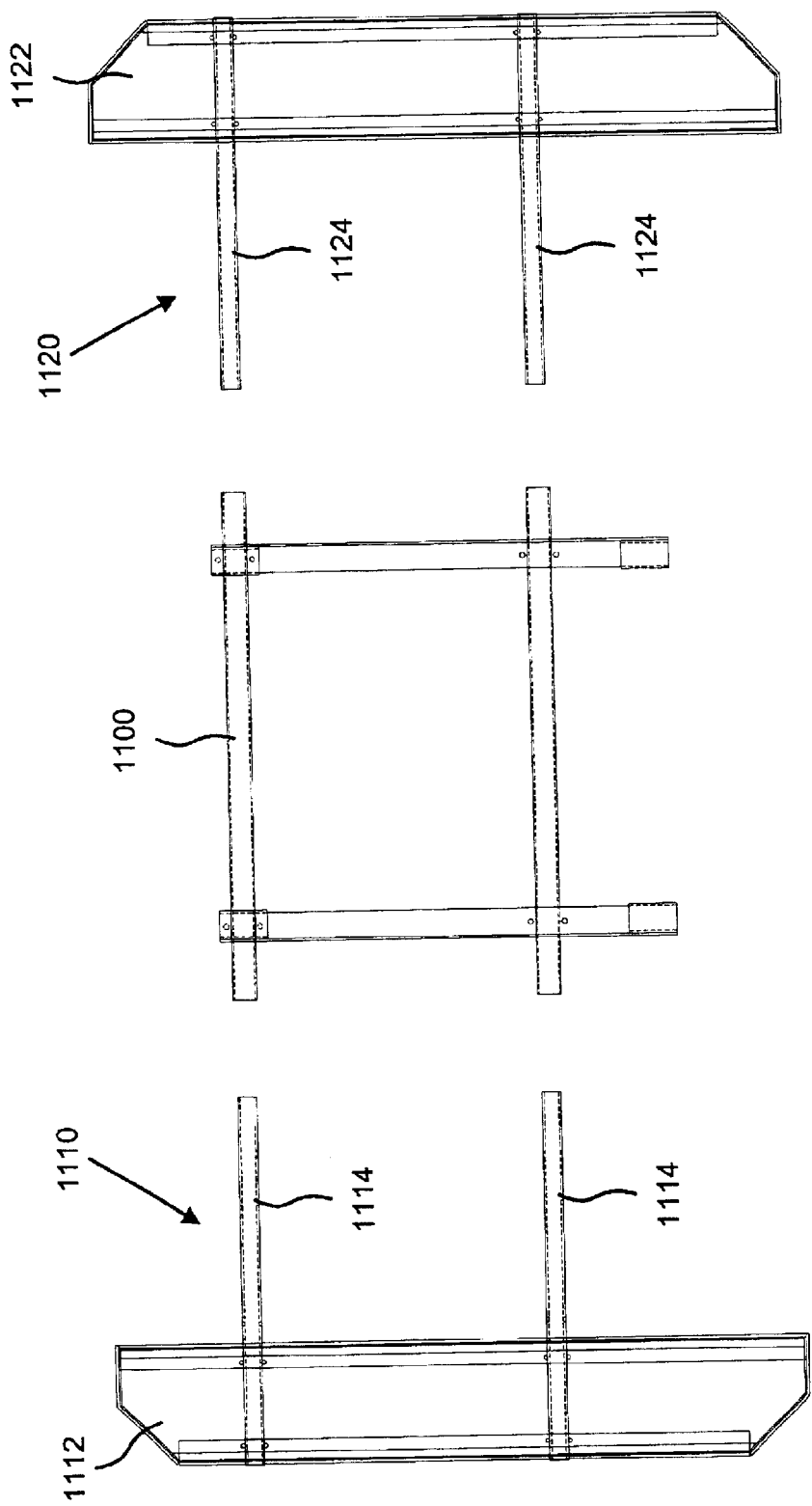
FIG. 11 illustrates adjustable side running boards in an implementation consistent with the principles of the invention.

FIG. 11 illustrates a top view of adjustable side running boards 1110/1120 in an implementation consistent with the principles of the invention. Running boards 1110/1120 may connect to a supporting member 1100 that may be permanently affixed to an underside of the vehicle 105. Running boards 1110/1120 may include a number of protruding members. 1114/1124 and a platform portion 1112/1122.

The protruding members 1114/1124 may be configured to slide within slightly larger receiving portions of the supporting member 1100. The protruding members 1114/1124 may have a number of slots which, in conjunction with fasteners (e.g., pins), determine how far into the supporting member 1100 the protruding members 1114/1124 protrude. In one implementation consistent with the principles of the invention, the protruding members 1114/1124 may be adjustable. For example, fixed in one lateral position, the platform portions 1112/1122 protrude beyond the sides of the vehicle 105. In such a position, users may ride on the running boards 111O/1120 when the vehicle 105 is moving.

In another position (e.g., for storage or transportation), the platform portions 1112/1122 of the running boards 1100/1120 may be retracted under the vehicle 105 so that they do not protrude beyond the sides of the vehicle 105. The platform portions 1112/1122 of the running boards 1110/1120 may include a textured upper surface to provide enhanced traction to users of the system 100.

The foregoing description of preferred embodiments of the invention provides illustration and description, but is not intended to be exhaustive or to limit the invention to the precise form disclosed. Modifications and variations will be apparent to those skilled in the art in light of the above teachings or may be acquired from practice of the invention.

For example, although "pins" have been described in various places, these are only one example of "readily removable connectors." Those skilled in the art will appreciate that other connectors, such as latches, may be used to accomplish the same functionality. It is specifically contemplated that where "pins" are described, other readily removable connectors known in the art may be substituted. As another example, although the term "hinge" is used in a number of places, this is but one illustrative example of rotational connectors, other examples of which may also be used interchangeably.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A vehicle-mounted system, comprising:
   a platform attachable to a front and a rear of a vehicle, a main surface of the platform adapted to be located above the vehicle;
   a plurality of ramps rotatably connected to the platform, each of the ramps including:
      an extending portion located under a top surface of the ramp;
   a first hydraulic system configured to incline the ramps relative to the main surface of the platform; and
   a second hydraulic system configured to extend the extending portions of the ramps.

2. The system of claim 1, wherein the platform includes:
   a deck portion located at a rear of the platform, and wherein the ramps are rotatably connected to the platform forward of the deck portion.

3. The system of claim 1, wherein the first hydraulic system includes:
   a plurality of hydraulic actuators connected between the platform and respective ones of the ramps, each of the hydraulic actuators configured to raise a forward end of the respective ramp, and
   a first hydraulic pump configured to provide hydraulic power to the hydraulic actuators.

4. The system of claim 3, wherein the first hydraulic pump is configured to provide hydraulic fluid at a relatively high pressure and a relatively low volume to move the hydraulic actuators at a relatively low velocity.

5. The system of claim 3, wherein the second hydraulic pump is configured to provide hydraulic fluid at a relatively low pressure and a relatively high volume to move the hydraulic actuators at a relatively high velocity.

6. The system of claim 1, wherein the second hydraulic system includes:
   a plurality of hydraulic actuators connected between the platform and respective ones of the extending portions, each of the hydraulic actuators configured to extend the respective extending portion, and
   a second hydraulic pump configured to provide hydraulic power to the hydraulic actuators.

7. The system of claim 1, further comprising:
   a plurality of controllers electrically connected to the first hydraulic system and the second hydraulic system, each of the controllers being configured to control the first hydraulic system and the second hydraulic system to incline and extend a respective one of the ramps.

8. The system of claim 7, wherein each of the controllers includes an interface connector that permits the controller to be separated from a control line and stored separately from the vehicle-mounted system.

9. The system of claim 1, further comprising:
   a collapsible handrail connected to at least one of the ramps, the collapsible handrail having an upper tube for gripping by a user.

10. The system of claim 9, wherein the upper tube of the collapsible handrail includes a telescoping portion configured to extend forward from the upper tube of the handrail, and
    wherein the extending portion of the at least one ramp includes a rotatably connected support member configurable to extend upward from the extending portion of the at least one ramp and to connect with the telescoping portion of the handrail to define a second handrail over the extending portion of the at least one ramp.

11. The system of claim 1, further comprising:
    a folding stairway configured to provide access to a rear of the platform, the stairway configured to vertically fold in two portions when not in use.

12. A vehicle-mountable system, comprising:
    a support structure attachable to a front and a rear of a vehicle and configured to extend above the vehicle;
    a ramp rotatably connected to the support structure, the ramp including an extending portion;
    a first hydraulic actuator configured to incline a forward end of the ramp;
    a ramp pump configured to move the first hydraulic actuator at a first speed;
    a second hydraulic actuator configured to extend the extending portion from the forward end of the ramp; and
    an extension pump configured to move the second hydraulic actuator at a second speed that is greater than the first speed.

13. The system of claim 12, further comprising:
    a controller connected to the ramp pump and the extension pump and configured to control the first hydraulic actuator and the second hydraulic actuator.

14. The system of claim 13, wherein the controller includes:
    a first button that when pressed causes the ramp pump to extend the first hydraulic actuator; and
    a second button that when pressed causes the ramp pump to retract the first hydraulic actuator.

15. The system of claim 13, wherein the controller includes:
    a third button that when pressed causes the extension pump to extend the second hydraulic actuator; and
    a fourth button that when pressed causes the extension pump to retract the second hydraulic actuator.

16. The system of claim 13, further comprising:
    a physical and electrical interface between the controller and the pumps that allows removal of the controller from the system.

17. A kit adapted to be mounted to a vehicle, comprising:
    a support structure attachable to a front and a rear of a vehicle and configured to extend above the vehicle;
    a ramp rotatably connected to the support structure, the ramp including an extending portion located within the ramp when retracted;
    a rear step connectable to the rear of the vehicle, the rear step being configured to either rigidly attach to the vehicle or attach to the vehicle so that the rear step may pivot upwards;
    a running board attachable to an underside of the vehicle, the running board being attachable in different positions so that the running board either protrudes from a side of the vehicle or rests substantially under the vehicle; and
    a ladder rotatably connected to a rear of the support structure, the ladder being configured to rotate upward to provide access to the rear of the vehicle.

18. The kit of claim 17, further comprising:
    a collapsible handrail connected to the ramp, the collapsible handrail having an upper tube for gripping by a user.

19. The kit of claim 18, wherein the upper tube of the collapsible handrail includes a telescoping portion configured to extend forward from the upper tube of the handrail, and wherein the extending portion of the ramp includes a rotatably connected support member extendable from the extending portion of the ramp to connect with the telescoping portion of the handrail to define an extending handrail over the extending portion of the ramp.

20. The kit of claim 17, further comprising:

a folding stairway configured to provide access to a rear of the support structure, the stairway configured to vertically fold in two portions when not in use.

21. The kit of claim 17, further comprising:

a first hydraulic system configured to change an inclination of the ramp; and a second hydraulic system configured to change an extension of the extending portion of the ramp.

22. A kit adapted to be mounted to a vehicle, comprising:

a platform attachable to a front and a rear of a vehicle and configured to extend above the vehicle;

a ramp rotatably connected to the platform, the ramp including an extending portion located under a main surface of the ramp when retracted;

a rear step connectable to the rear of the vehicle, the rear step being attachable to the vehicle so that the rear step may pivot upwards; and a folding stairway configured to provide access to a rear of the platform, the stairway configured to vertically fold against the rear of the vehicle when not in use.

23. The kit of claim 22, wherein the folding stairway is configured to unfold and lock in position to link an upper surface of the platform with ground.

24. The kit of claim 22, further comprising:

a running board attachable to an underside of the vehicle, the running board being attachable in different positions so that the running board either protrudes from a side of the vehicle or rests substantially under the vehicle.

25. The kit of claim 22, further comprising:

a first hydraulic system configured to change an inclination of the ramp; and a second hydraulic system configured to change an extension of the extending portion of the ramp.

26. A system, comprising:

a vehicle;

a support structure attachable to a front and a rear of the vehicle and configured to extend above the vehicle;

a ramp rotatably connected to the support structure, the ramp including an extending portion located within the ramp when retracted;

a rear step connectable to the rear of the vehicle, the rear step being configured to either rigidly attach to the vehicle or attach to the vehicle so that the rear step may pivot upwards;

a running board attachable to an underside of the vehicle, the running board being attachable in different positions so that the running board either protrudes from a side of the vehicle or rests substantially under the vehicle; and a ladder rotatably connected to a rear of the support structure, the ladder being configured to rotate upward to provide access to the rear of the vehicle.

27. A system, comprising:

a vehicle;

a platform attachable to a front and a rear of the vehicle and configured to extend above the vehicle;

a ramp rotatably connected to the platform, the ramp including an extending portion located under a main surface ramp when retracted;

a rear step connectable to the rear of the vehicle, the rear step being attachable to the vehicle so that the rear step may pivot upwards; and a folding stairway configured to provide access to a rear of the platform, the stairway configured to vertically fold against the rear of the vehicle when not in use.

* * * * *

UNITED STATES PATENT AND TRADEMARK OFFICE
CERTIFICATE OF CORRECTION

PATENT NO. : 6,832,667 B1
DATED : December 21, 2004
INVENTOR(S) : Steven Kahre et al.

It is certified that error appears in the above-identified patent and that said Letters Patent is hereby corrected as shown below:

Column 12,
Line 31, insert -- of the -- after "surface".

Signed and Sealed this

Twelfth Day of April, 2005

JON W. DUDAS
*Director of the United States Patent and Trademark Office*